(12) United States Patent
Seller et al.

(10) Patent No.: US 12,292,498 B2
(45) Date of Patent: May 6, 2025

(54) DOPPLER RANGING SYSTEM

(71) Applicant: Semtech Corporation, Camarillo, CA (US)

(72) Inventors: Olivier Bernard André Seller, Sainte-Soulle (FR); Christophe Jean Jacques Devaucelle, Boudevilliers (CH)

(73) Assignee: SEMTECH CORPORATION, Camarillo, CA (US)

( * ) Notice: Subject to any disclaimer, the term of this patent is extended or adjusted under 35 U.S.C. 154(b) by 679 days.

(21) Appl. No.: 17/533,762

(22) Filed: Nov. 23, 2021

(65) Prior Publication Data

US 2022/0187443 A1 Jun. 16, 2022

(30) Foreign Application Priority Data

Dec. 11, 2020 (EP) .................................... 20213605

(51) Int. Cl.
*G01S 13/84* (2006.01)

(52) U.S. Cl.
CPC .................................... *G01S 13/84* (2013.01)

(58) Field of Classification Search
CPC ....................................................... G01S 13/84
USPC ......................................................... 342/125
See application file for complete search history.

(56) References Cited

U.S. PATENT DOCUMENTS

| | | | |
|---|---|---|---|
| 7,561,048 B2 * | 7/2009 | Yushkov | H04B 1/0007 702/158 |
| 8,254,344 B2 * | 8/2012 | Akita | H04W 48/12 370/336 |
| 8,559,554 B2 * | 10/2013 | Vossiek | H04B 1/7174 375/259 |
| 8,682,389 B2 * | 3/2014 | Siomina | H04W 64/00 455/556.1 |
| 9,142,071 B2 * | 9/2015 | Ricci | B60R 25/00 |
| 9,413,418 B2 * | 8/2016 | Bottazzi | H04B 1/707 |
| 9,551,786 B2 * | 1/2017 | Seller | G01S 13/74 |
| 10,073,530 B2 * | 9/2018 | Moshfeghi | G06F 3/017 |
| 10,148,313 B2 * | 12/2018 | Seller | H04W 56/0015 |
| 10,534,084 B2 * | 1/2020 | Crouch | G01S 7/484 |
| 11,693,106 B2 * | 7/2023 | Lang | G01S 13/931 342/109 |

(Continued)

FOREIGN PATENT DOCUMENTS

| | | |
|---|---|---|
| EP | 2449690 A1 | 5/2012 |
| EP | 2763321 A1 | 8/2014 |

(Continued)

OTHER PUBLICATIONS

English Translation of Notice of Preliminary Rejection for KR 1020210176424, dated Nov. 10, 2022, 5 pgs.

*Primary Examiner* — Nuzhat Pervin
(74) *Attorney, Agent, or Firm* — BLANK ROME LLP

(57) ABSTRACT

An extension of the LoRa modulation with an improved ranging mode. A master and a slave device exchange a request and a reply that contain sequences of chirps that are carefully aligned in time, frequency, and preferably also phase, such that the master device can ascertain the propagation delay to the slave by demodulating the reply. Request and reply include chirps having different slopes, preferably slopes of equal absolute value and opposite sign. The slope diversity permits an unbiased estimation of the Doppler shift.

15 Claims, 5 Drawing Sheets

(56) References Cited

U.S. PATENT DOCUMENTS

| | | | |
|---|---|---|---|
| 11,740,345 B2* | 8/2023 | Narayana Moorthy | ..................... G01S 13/222 342/112 |
| 2009/0285313 A1* | 11/2009 | Vossiek | ................ G01S 13/825 375/259 |
| 2013/0201003 A1* | 8/2013 | Sabesan | ................ G01S 13/878 340/10.1 |
| 2014/0225762 A1* | 8/2014 | Seller | ................... G01S 13/876 342/125 |
| 2016/0003940 A1* | 1/2016 | Seller | ........................ G01S 7/40 342/132 |
| 2016/0061947 A1* | 3/2016 | Patole | .................. G01S 13/343 342/195 |
| 2016/0094270 A1* | 3/2016 | Seller | ................... H04J 3/0608 375/139 |
| 2016/0327633 A1* | 11/2016 | Kumar Y.B | ................ G01S 7/35 |
| 2017/0276779 A1* | 9/2017 | Seller | ...................... G01S 13/84 |
| 2017/0324441 A1* | 11/2017 | Seller | ...................... G01S 5/0246 |
| 2018/0006680 A1* | 1/2018 | Seller | ............... H04L 27/26522 |
| 2018/0007655 A1* | 1/2018 | Raghupathy | ............ G01S 19/11 |
| 2018/0156911 A1* | 6/2018 | Pokrass | ................. G01S 13/931 |
| 2019/0081844 A1* | 3/2019 | Lee | ....................... H04L 5/0048 |
| 2019/0137602 A1* | 5/2019 | Longman | ................ G01S 13/32 |
| 2019/0285725 A1* | 9/2019 | Roger | .................... G01S 7/023 |
| 2020/0033442 A1* | 1/2020 | Gulati | ...................... H04K 1/00 |
| 2020/0057136 A1* | 2/2020 | Doescher | ............. G01S 13/584 |
| 2020/0309939 A1* | 10/2020 | Subburaj | ............... G01S 13/584 |
| 2020/0363518 A1* | 11/2020 | Rao | ........................ G01S 13/282 |
| 2021/0186329 A1* | 6/2021 | Tran | .................... G08B 25/016 |
| 2021/0341604 A1* | 11/2021 | Greenberg | ............ G01S 7/4818 |
| 2022/0099819 A1* | 3/2022 | Rajendran | ............... G01S 13/42 |
| 2022/0155405 A1* | 5/2022 | Markhovsky | ......... G01S 5/0218 |
| 2022/0326368 A1* | 10/2022 | Rao | ........................ G01S 13/536 |

FOREIGN PATENT DOCUMENTS

| | | | | |
|---|---|---|---|---|
| EP | 2767848 A1 * | 8/2014 | .......... | G01S 13/343 |
| EP | 3264622 A1 | 1/2018 | | |
| GB | 2487374 A * | 7/2012 | ............ | G01S 13/24 |
| KR | 1020200037148 A | 8/2020 | | |

* cited by examiner

DOPPLER RANGING SYSTEM

REFERENCE DATA

The present application claims priority of European patent application EP20213605.7 of Dec. 11, 2020 in the name of the applicant.

TECHNICAL DOMAIN

The present invention concerns, in embodiment, receivers and transmitters for chirp-modulated, spread-spectrum radio signals with the capability of determining the distance, or range between the transmitter and the receiver.

RELATED ART

Chirp-modulated signal, as embodied by the LoRa™ technology of Semtech corporation, which will be referred to simply as LoRa in the following of this disclosure, are used in a variety of situations and particularly in low-power machine-to-machine communication over long distances. LoRa modulation is disclosed, among others, by European patent applications EP2449690 and EP2767848 in the name of the present applicant. Importantly, The LoRa modulation allows the determination of the propagation time between the transmitter and the receiver with simple means, accessible to low-power IoT devices.

Ranging over long distance is especially useful when it is desired to localise an object over long distances, possibly because the object has been stolen or mislaid, and in tracking of assets such as vehicles, cattle, or transportable containers.

In most application that involve ranging and localization, the tracked object is moving. Having a reliable estimation of the object's speed, as well as of its distance is advantageous, both for the intrinsic value of this information, and because it can be used to improve the reliability of the communication.

Radar systems can determine the speed of the tracked target through the determination of the Doppler shift of the return signal. Some systems based on active transponders have also this function, provided the frequency references of transmitter and transponder are aligned. LoRa receivers can determine their ranges without an accurate alignment of their frequency references, thanks to the duality between time and frequency that is inherent in LoRa modulation. Lacking accurately aligned frequency references, however, conventional LoRa systems cannot determine the Doppler shift of signals with precision.

EP2767848 describes a distance estimation which is not biased, assuming identical frequencies of operation in transmitter and receiver, and that transmitter and receiver are stationary. When the receiver and the transmitter are in relative motion, this does not hold. Other factors as thermal drift, aging, or crystal pulling from the amplifier, can have the same effect. A goal of the present invention is the provision of a radio system that overcomes these limitations.

U.S. Pat. No. 8,559,554 B2 discloses a strobed continuous-wave frequency-modulation ranging system.

In several known cases, including positioning of mobile nodes and beamforming, it is necessary or advantageous to know the angle of arrival of a radio signal. The present invention relates also to an advanced LoRa receiver that can determine this angle better than conventional receiver devices.

SHORT DISCLOSURE OF THE INVENTION

According to the invention, these aims are attained by the object of the attached claims.

SHORT DESCRIPTION OF THE DRAWINGS

Exemplar embodiments of the invention are disclosed in the description and illustrated by the drawings in which:

FIG. 1 shows, in schematic simplified fashion, the structure of a radio modem according to one aspect of the present invention, FIG. 2a plots the instantaneous frequency of a base chirp and of a modulated chirp according to one aspect of the invention. The phase of the same signals is represented in FIG. 2b, and FIG. 2c plots the real and of the complex component of the base chirp and of a modulated chirp, in the time domain, and in the baseband representation.

Figure 6:
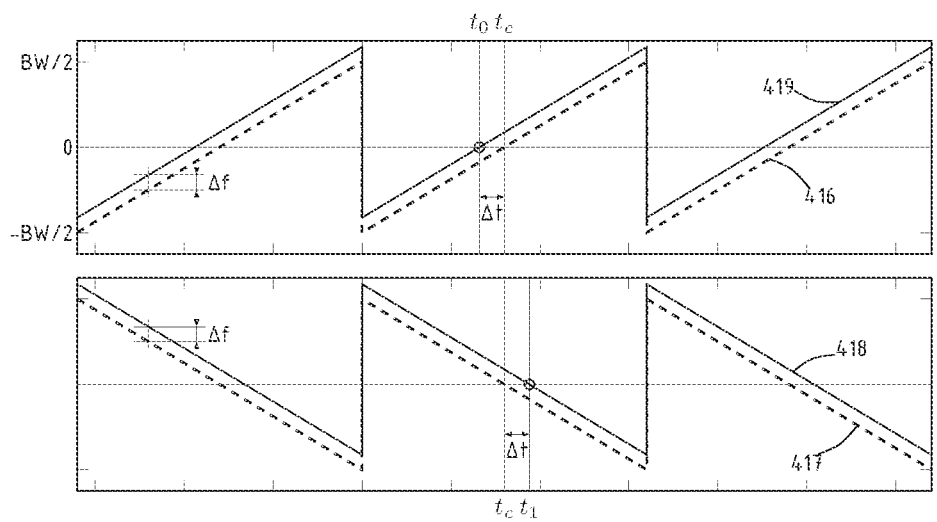
Figure 7:
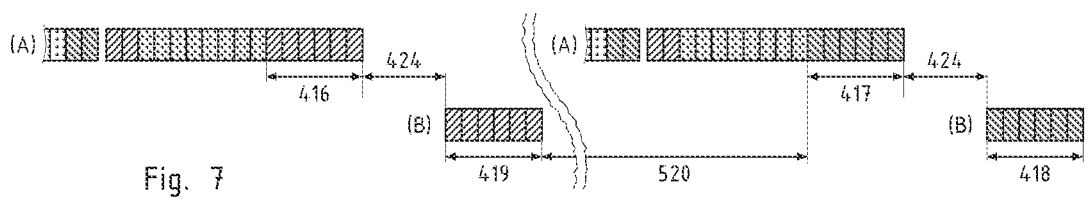
Figure 8:
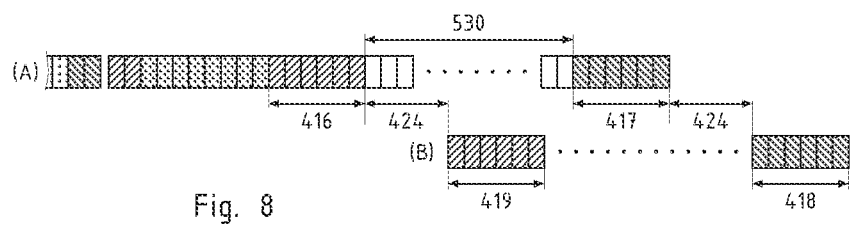

FIG. 6 plots chirps of different slopes and compares them having regard to the time alignment FIGS. 7 and 8 represent two exchanges of ranging requests and replies with chirps of different slopes.

Figure 9:
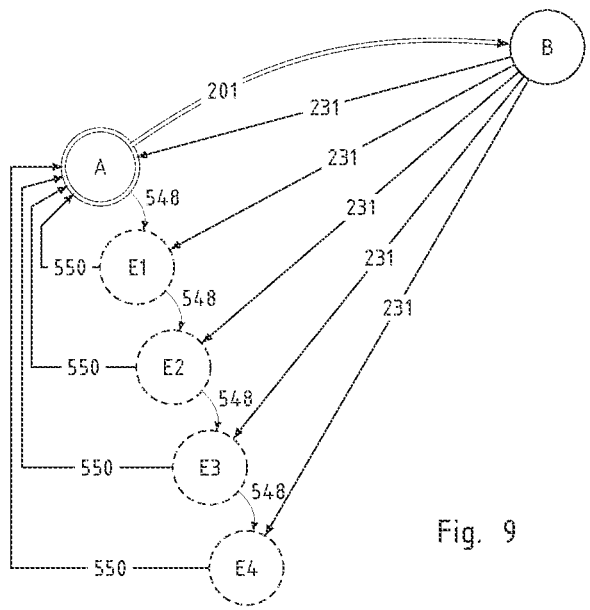
Figure 10:
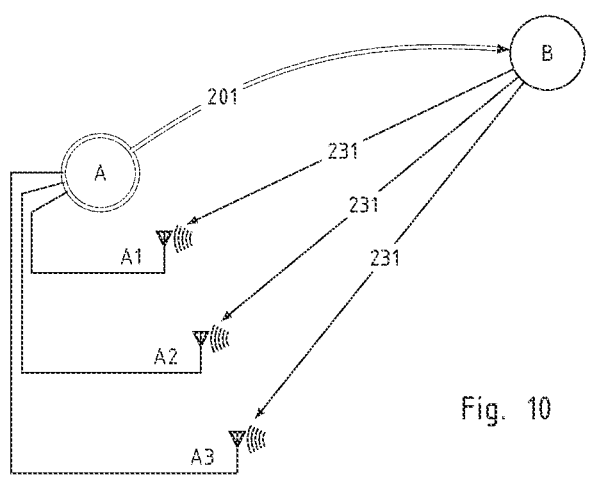

FIGS. 9 and 10 represent variants of the invention with angle of arrival determination.

Figure 11:
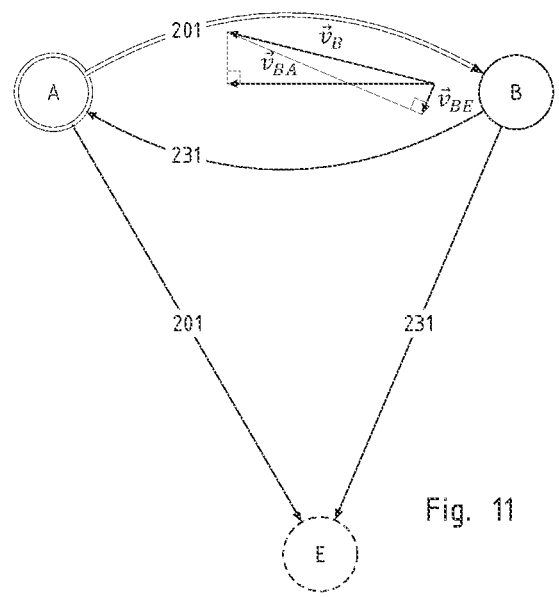
Figure 12:
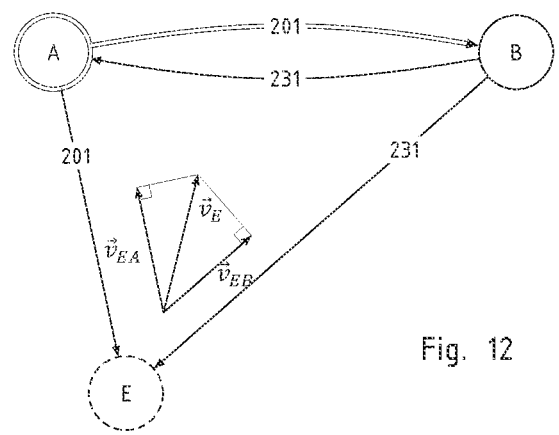

FIGS. 11 and 12 shows an exchange of ranging chirps between a master and a slave with a passive listener node.

EXAMPLES OF EMBODIMENTS OF THE PRESENT INVENTION

Figure 1:
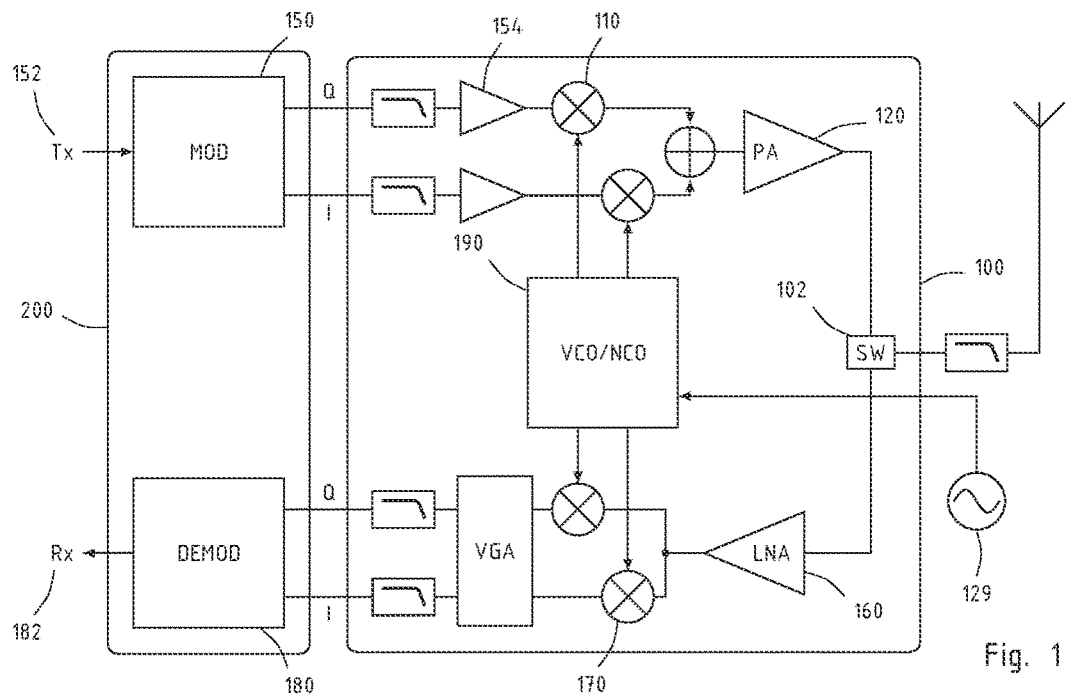

Several aspects of the chirp modulation technique employed in the present invention are described in European Patent Application EP2449690, which is hereby incorporated by reference, and will be reminded here summarily. The radio transceiver that is schematically represented in FIG. 1 is a possible embodiment of the invention. The transceiver includes a baseband section 200 and a radiofrequency section 100. It includes a baseband modulator 150 that generates a baseband complex signal based on the digital data 152 at its input. This is then converted to the desired transmission frequency by the RF section 100, amplified by the power amplifier 120, and transmitted by the antenna through the RF Switch 102.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q) comprising a series of chirps, then treated by the baseband processor 180, whose function is the reverse of that of the modulator 150, and provides a reconstructed digital signal 182.

As discussed in EP2449690, the signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile f(t) of their instantaneous frequency or also by the function φ(t) defining the phase of the signal as a function of the time. Importantly, the processor 180 is arranged to process and recognize chirps having a plurality of different profiles, each corresponding to a symbol in a predetermined modulation alphabet.

Figure 2A:
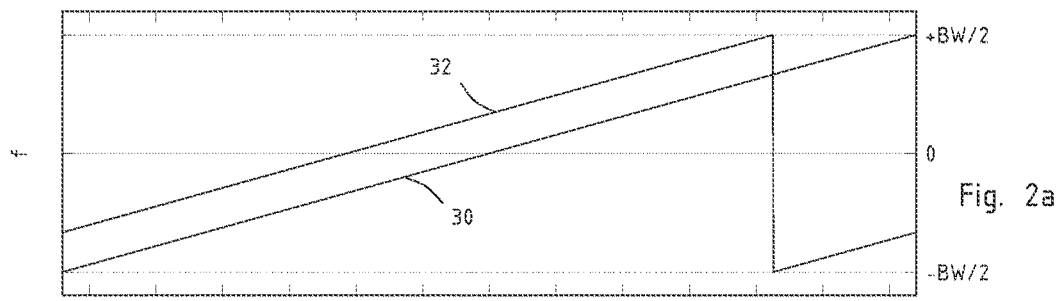
Figure 2B:
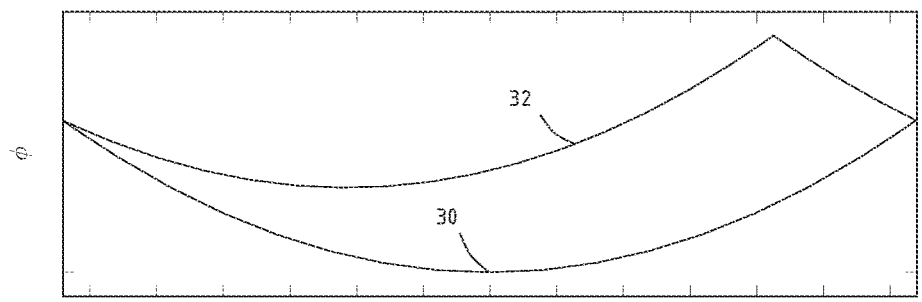
Figure 2C:
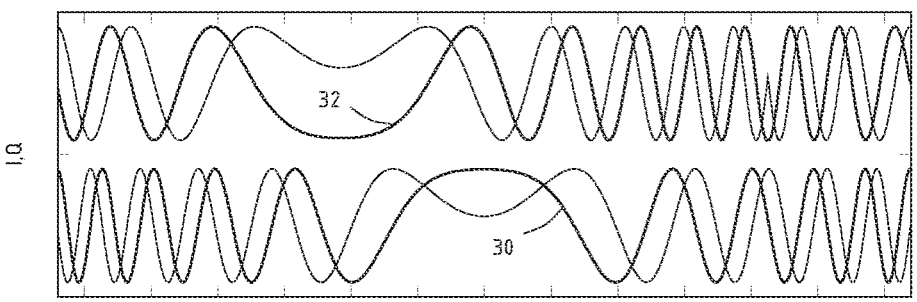

According to an important feature of the invention, the received signal Rx can comprise base chirp (also called unmodulated chirps in the following) that have specific and predefined frequency profile, or one out of a set of possible modulated chirps, obtained from base chirps by time-shifting cyclically the base frequency profile. FIGS. 2a and 2b illustrate, by way of example, possible frequency and phase profiles of a base chirp 30 and of one modulated chirp 32 between the time instant t=$t_0$ at the beginning of a chirp and the instant t=$t_1$ at the end of the chirp, while FIG. 2c shows the corresponding baseband signals in the domain of time. The horizontal scale corresponds for example to a symbol and, although the plots are drawn as continuous, they in fact represent a finite number of discrete samples, in a concrete implementation. As to the vertical scales, they are normalized to the intended bandwidth or to the corresponding phase span. The phase is represented in FIG. 2b as if it were an unbounded variable, but it may in fact span across several revolutions in a concrete implementation.

In the example depicted, the frequency of a base chirps increases linearly from an initial value −BW/2 to a final value BW/2 where BW denotes the bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol or, otherwise said, the processor 180 needs to process a signal that comprises a plurality of frequency chirps that are cyclically time-shifted replicas of a base chirp profile, and extract a message that is encoded in the succession of said time-shifts.

As it will be clearer in the following, the signal may include also conjugate chirps that are complex conjugate of the base unmodulated chirp. One can regard these as downchirps, in which the frequency falls from $f_0$=BW/2 to $f_1$=−BW/2.

The operation of evaluating a time shift of a received chirp with respect to a local time reference may be referred to in the following as "dechirping", and can be carried out advantageously by a de-spreading step that involves multiplying the received chirp by a complex conjugate of a locally-generated base chirp, sample by sample. This gives rise to an oscillating digital signal whose main frequency can be shown to be proportional to the cyclic shift of the received chirp. The demodulation then may involve a Fourier transform of the de-spread signal. The position of the maximum of the Fourier is a measure of the cyclic shift, and of the modulation value. In mathematical terms, denoting the k-th received symbol with $S_j^k$, the corresponding modulation value is given by m(k)=arg $\max_n$ (|X(k,n)|) where X(n,k)= $\mathcal{F}(S_j^k \cdot \overline{b}_j)$ denotes the Fourier transform of the product between $S_j^k$ and the conjugate of a base chirp $\overline{b}_j$. Other manners of demodulating the signal and extracting the cyclic shift of each symbol are possible, however.

The complex phase of each LoRa symbols is implicitly defined by its instantaneous frequency profile f(t), modulo an undetermined offset. In many implementations, for example those in which the symbols are synthesized by a voltage controlled oscillator, the phase can never show discontinuities, and each symbol has a phase offset that is implicitly determined by its cyclic shift, such that the phase is continuous at symbol borders, as shown in FIG. 2b. This requirement can be relaxed, however, and each symbol could be synthesized with an arbitrary phase offset. At the receiver's end, the received chirps will present a phase offset due, among other factors, to channel effects and mismatches between the time references of transmitter and receiver.

The phase offset of each received symbol is detectable by the receiver, for example based on the phase at the peak of the Fourier transform after the dechirping operation. If X(n,k)= $\mathcal{F}(S_j^k \cdot \overline{b}_j)$ denotes the Fourier transform and m(k) =arg $\max_n$(|X(k,n)|) the modulation value, then the phase offset of each symbol can be determined by φ(k)=arg(X(k, m(k)). Although other ways of estimating the phase are possible and available to the invention, this algorithm is convenient where the spectrum X(k,n) is already available and is relatively immune to noise.

Figure 3:
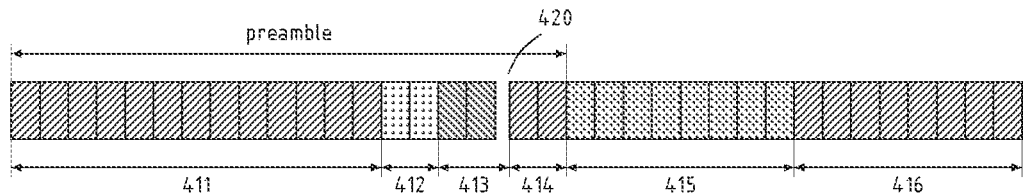
FIG. 3 represents schematically the structure of data frames exchanged between two devices in the frame of the present invention.
Figure 4:
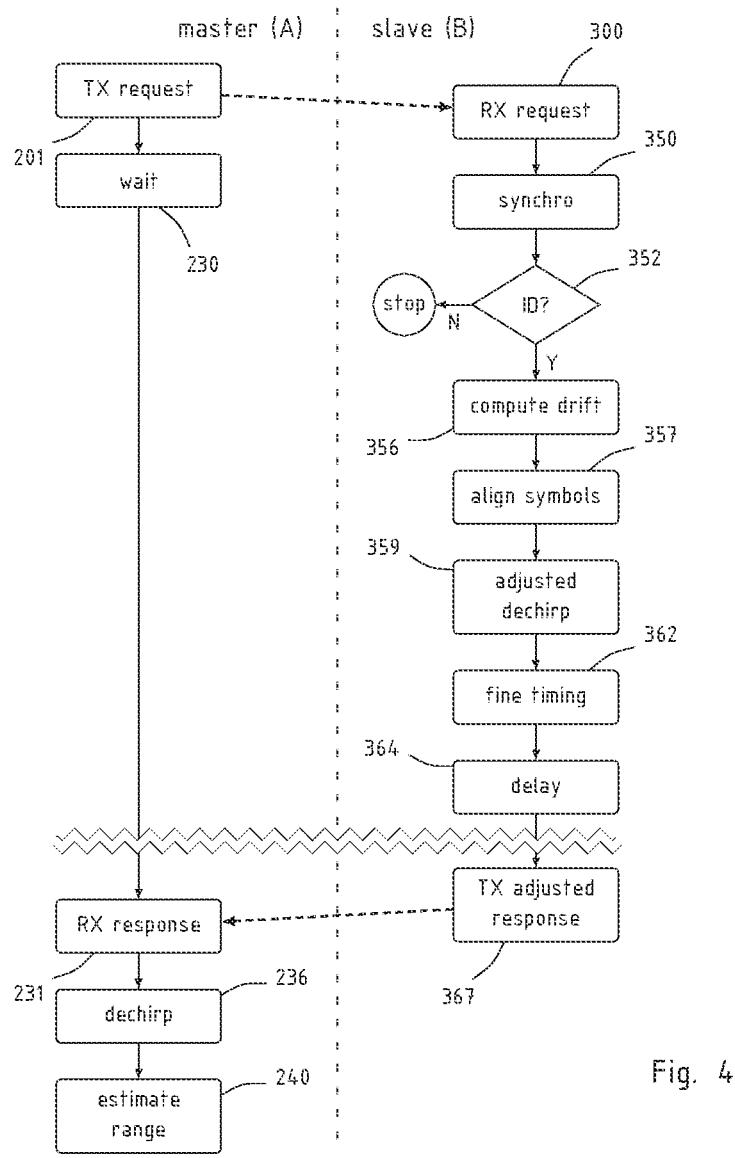
FIG. 4 shows schematically the steps involved in a ranging exchange in a LoRa system.

Preferably, the signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command. In the frame of the invention, several structures are possible for the data frame, depending inter others, on the channel condition, transmitted data or command. FIG. 3 represents schematically, a frame structures that can be employed in various aspects of the present invention.

In the presented example, the frame has a preamble followed by a data header 415 and a data payload 416. The preamble starts with detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter.

The end of the detect sequence is marked by one or more, preferably two, frame synchronisation symbols 412 that are chirps modulated with predetermined values, for example a first chirp with a modulation value of 4, and a second one with the opposite modulation N-4. These modulated symbols are used to get a frame synchronization as disclosed by EP2763321A1 and EP3264622A1.

Frequency synchronisation symbols 413 may consist in one or more, preferably two chirps that are complex conjugate of the base unmodulated chirp, hence they have an opposite slope to all other symbols. These are preferably followed by a silence 420 to allow the receiver's alignment, fine synchronisation symbols 414 that are unmodulated base chirps used to evaluate and correct a residual timing drift. Having demodulated the header, the receiver can determine a shift amount and adapt the frequency and phase of its clock with those of the sender, thus allowing the decoding of the following data.

The frame represented in FIG. 3 could include a ranging request sent by a first radio device, acting as master to a second radio device, acting as slave, to obtain the range, or distance, between the two devices. In this use case, the header 515 will include an indication that the frame is a ranging request, and an identification code of the slave. Only the slave having an identification number matching with the identification code should respond to the ranging request.

The ranging chirps 416 contains a succession of chirps having a predetermined structure. In a possible realization, the ranging chirps may be unmodulated chirps, i.e. base chirps.

Figure 5:
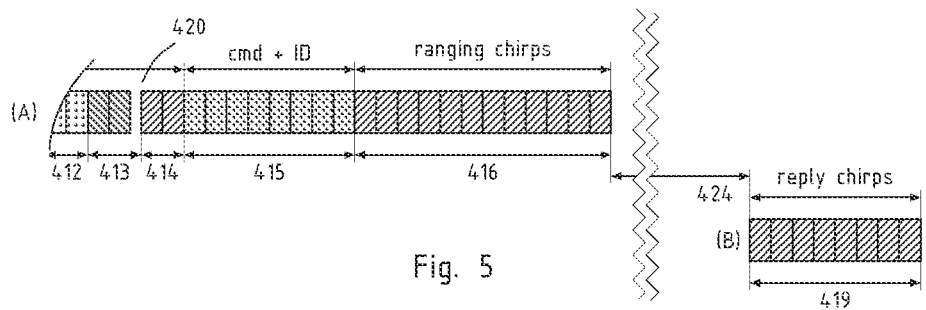
FIG. 5 illustrates the corresponding data frames.

FIG. 5 illustrates schematically a possible sequence of steps in master and slave devices during a ranging exchange.

The exchange is initiated by the master (A) that transmits a ranging request (step 201) designating one slave device and waits (step 230) for the appropriate response. The slave (B) receives the request (step 300) and deals with it as with a normal transmission at first. The slave detects the preamble 411 and synchronizes its time and frequency reference (step 350) and decodes the header 415 that informs the slave that the frame is a ranging request. The slave then compares (step 352) the ranging request ID to its own ID. If they match, it will proceed to next steps. During this first phase, the slave has estimated a frequency offset between master and itself. This frequency offset is used to compute (step 356) a timing drift between master and slave, assuming timing and frequency derive from a same time reference. The slave then carries out the ranging specific steps based on the ranging chirps 416.

Ranging synchronization (step 357): this is to align in time to the ranging symbols transmitted by the master. Indeed, there can be a time offset right after the header, as the header is robust to small time offsets.

Ranging computation (step 359). For each symbol, an adjusted dechirp operation is performed. A different local chirp is synthesized for dechirping each symbol in order to adjust for the timing drift: first the slope of the chirp is modified, by a very small fraction corresponding to the crystal offset. Second the starting frequency of the chirp is modified, to accommodate the accumulated timing error since the ranging synchronization instant, this value is equal to the symbol index times an evaluated timing drift per symbol. We here use fully the frequency-time equivalence of chirps, and the fact that these compensations are very small. In alternative, the receiver could interpolate over time, but this would be much more complex than a frequency shift. The compensations are small, frequency shifts of some PPMs won't make the signal step away from the channel. Frequency-time equivalence of chirps means that a time offset is equivalent, in certain aspects, to a frequency offset.

After FFT, the relative value of output at expected position (bin 0, no modulation) is compared to its neighbours. Then an interpolation is performed to find a fine timing (step 362). This amounts to evaluating the frequency of a sinusoid from a discrete observation of FFT values not exactly placed on the desired frequency and can be carried out in various ways.

Several symbols are averaged together to get the fine timing estimate. This allows the slave to determine the exact timing instant at which the response is to be transmitted by adding together the Coarse Timing shift and the Fine Timing shift determined form the header (step 350), the duration of the ranging sequence given by the expression Ranging_symbols_numbers×(symbol_duration+timing_drift_per_symbol) and a predetermined ranging response offset. The slave thus waits until the timing instant (step 364) and transmits a ranging response (step 367).

The ranging response offset is a predetermined time interval that accommodates processing time and uses the delay inside receive and transmit radios of the slave. Assuming the estimates are correct, the ranging response starting time of the signal at the antenna should equal the starting time of the received request, plus a fixed offset, preferably corresponding to an integer number of symbols. The ranging response offset can be constant or adaptively adjusted in order to compensate for temperature changes or other drift sources.

Importantly, by determining the coarse and fine time shift estimates and the timing drift, the slave device of the invention is capable to determine the time and frequency shifts of its own time reference with respect to that of the master, based on the time and frequency of chirps contained in the ranging request, thanks to the special property of the ranging request that includes chirp-modulated signals as explained above.

The ranging response is made of several unmodulated chirps. Preferably the same compensation is used than during the adjusted dechirp step 359 in ranging computation: a slope compensation, plus a timing drift accumulation compensation. This comes in addition to a compensation of transmitted frequency, according to estimated frequency. In this way, the ranging response is precisely aligned in time and frequency with the time reference of the master.

On the master side, the reception of ranging response (step 231) requires no further synchronization than a coarse timing alignment, to account for the unknown distance between slave and master. The master assumes that frequency and timing are perfectly aligned. The ranging response does not need to embed frequency estimation symbols. The master only estimates a timing, performing exactly the same steps (236 and 240) than the slave in ranging computation without compensation. This simplifies the modem, as the ranging core is common to both master and slave.

The above steps lead to an estimation of the range without a precise alignment of the frequency references of master and slave. The uncertainty on the frequency determination, in conventional LoRa exchanges is typically about 30 Hz (spreading factor SF7, BW-500 kHz mode). In an exchange between two LoRa devices, two independent errors sum up, hence the accuracy is of about 60 Hz, which corresponds to a relative speed of 75 km/h between slave and master. This s not enough in many cases.

In a variant of the invention, the reply chirps are aligned with the ranging chirps in time, frequency, and phase. The adjusted local chirps are adjusted in slope and include a frequency offset, as disclosed above. If the adjustments were carried out without minding to the phase, they would introduce minute variations in the phase of the symbols. LoRa receivers can demodulate symbols one by one regardless of their phase offsets but, to allow coherent reception, the adjustment is done in a way that does not modify the phase, such that the response chirps are aligned in phase with the ranging request. This step may include the estimation of a common phase over all symbols of the ranging request part.

The synthesis of the ranging response includes a step of phase compensation after each slope and timing compensation, so that the phase of the reply chirps is not altered by these. In addition, the slave response is compensated for the common phase error estimated during fine frequency estimation. Since the same PLL is used for reception and transmission, and since the RX/TX switch does not appreciably change the phase of this frequency reference, this compensation of phase will allow the master measure the phase of the propagation channel, if no Doppler shift is present. The master needs not compensate for a phase bias between receive and transmit at the slave side. In this variant of the invention, the master can ascertain the phase of the propagation channel modulo a constant, frequency-independent offset. An important information contained in this is the variation of channel phase with frequency.

In other variants of the invention, the accurate estimation of the phase is used for angle of arrival determination, using a diversity scheme on the master device. If the phase of the same signal, or the range or the distance to the transmitter, can be determined with enough precision by a plurality of antennas or by a plurality of receivers that are in a known space relationship, the angle of arrival can be determined by known methods.

Optionally, one or more device acting as passive listener, or spy, located on the same board as the master, using the same clock reference but each with a different antenna, could also listen to the ranging exchange between the master and the slave, and perform the timing and phase estimation processing. Combining the phase estimation of all the devices with the knowledge of antenna position allows to estimate an angle of arrival for the response, and so the direction of the slave.

In the embodiment illustrated on FIG. 9, the master device A is connected to one or more simple radio-receiving devices E1-E4 that listen silently to the ranging reply signal 231 received by the master device A (spy reception). In a convenient arrangement, the receivers E1-E4 may be implemented as receiver chips on the same electronic board as the master or on nearby boards that are in a fixed space relation with the master. The spy devices E1-E4 receive a clock signal from the master (arrows 548) and have each a different antenna. The timing and phase estimation processing described above is performed in parallel in the master device A and in the spy devices E1-E4, and the phase estimations from the spy devices E1-E4 are gathered by the master (arrows 550). Combining the phase estimation of all the receivers with the knowledge of antennas positions allows to estimate an angle of arrival for the response, and so the direction of the slave.

In another embodiment shown in FIG. 10 a single receiving device, possibly implemented in a single semiconductor chip, acts as master A and receives the signal sequentially from the multiple antennas 290. The master transmits the ranging request 201 from a single antenna, and switches among the antennas while receiving the ranging response 231. The antenna switch times are synchronous with the chirp symbols, and the master select a switching sequence such that each antenna receives chirps of different slopes. For example if the master device has 3 antennas called A1, A2, and A3, and the ranging response is composed of 10 chirps with positive slope followed by 10 symbols of negative slope, then the master may select a sequence of length 10 that selects each of the antennas in turn and repeat it twice, first for the positive-slope chirps, and then for the negative-slope ones. A possible switching sequence is (A1 A1 A1 A1 A2 A2 A2 A3 A3 A3 A1 A1 A1 A1 A2 A2 A2 A3 A3 A3), but many others are possible. Repeating the switching sequence for each set of ranging response symbols having a given slope allows to estimate for each antenna an unbiased distance and a doppler speed, which the gateway A can use to determine the angle of arrival.

Fine frequency estimation on the master side is also useful to detect and compensate a Doppler shift, however with some limitations on the detection range. Errors of a multiple of one frequency bin are not be observable. For instance, taking a spreading factor SF10, 125 kHz bandwidth, one frequency bin corresponds to 125 kHz/1024, or 122 Hz. If the frequency of operation is 2.4 GHz, this corresponds to a radial speed of 122/2.4e9*3e8/2=7.6 m/s=27 km/h. In some cases, therefore, the master could wrongly estimate that no Doppler is present. This limitation on direct Doppler shift estimation requires more estimation means.

According to an important aspect of the invention, the ranging requests comprises ranging chirps having different slopes, and the chirps of the ranging reply, being aligned in time and frequency with those, will have also different slopes. In LoRa modulation, the chirp slope determines the proportionality coefficient between time and frequency. If all the chirps have a same slope, there is an ambiguity between time offset and frequency offset. A diversity of slopes in the ranging chirps allow to determine the time and the frequency independently.

This is easy to see when the chirps have opposite slopes, as shown in FIG. 6. The upper plot shows a ranging chirp with rising slope 416, centred in the interval between −BW/2 and +BW/2, and the corresponding reply chirp 419 that has a frequency shift $\Delta f$, due to Doppler effect, or to a misalignment between the frequency references of master and slave (the offset in the plot is exaggerated for better visibility). When the time of arrival of a symbol is obtained by dechirping, the upwards frequency shift $\Delta f$ causes the chirp to appear advanced by a time offset $\Delta t$. The lower part of the plot shows the same for a descending ranging chirp 418 and the corresponding reply 417. The reply is shifted upwards by the same amount $\Delta f$ but, since the slope is opposite, it appears retarded by $\Delta t$.

Denoting with $t_0$ and $t_1$ the time-of-flight estimates obtained by the up-chirps 416 and respectively the down-chirps 418, the average $t_c=(t_0+t_1)/2$ provides an unbiased range estimate, while the difference $(t_1-t_0)$ is an estimate of the frequency shift $\Delta f$ and, neglecting other sources of drift, of the Doppler shift. Therefore, supposing the thermal drift negligible, the invention provides an improved range determination for moving devices and allows to deduce the Doppler shift and the relative velocity between master and slave. The estimation of $t_c$ and $\Delta f$ can be executed in the master device, or in another device that is connected to the master (not represented), or by a passive radio device in the system of the invention that listens to the exchange between the master A and the slave B without emitting radio signals. Should the ranging sequences include chirps with different slopes, the unbiased range and the Doppler shift would be derivable by suitable linear combinations of the respective time-of-flight measurements, which reduce to the simple symmetric form disclosed above in the case of opposite slopes.

Preferably, the Doppler shift obtained with the method disclosed above is checked for consistency with the values of Doppler shift and position obtained for the same slave device in preceding measures, or against a predetermined maximum speed threshold, and rejected if found inconsistent.

The invention allows several variants in which the ranging chirps and the corresponding replies are variously distributed. In a possible implementation, the ranging chirps will be organized in two groups. A first groups of identical chirps with a first slope (for example rising chirps or up-chirps) and a second group of identical chirps with a second slope opposite to the first slope (for example falling chirps or down-chirps). The groups are separated by a time interval that can be variously extended, and may be a silence, during which the master does not transmit, or contain other chirps having any suitable meaning.

The ranging request containing the ranging chirps may be split into two separate data frames, as represented in FIG. 7. A first frame comprises a first set 416 of ranging chirps having a first slope, for example up-chirps, and to this first frame the slave device responds with a first ranging reply containing chirps 419 that have been adjusted by the slave to be aligned with the received ranging chirps. The first ranging reply reaches the master device after a delay 424 that corresponds to the propagation time between A and B plus the delay 364 (see FIG. 5) inserted by the slave. The master transmits a second frame after a delay 520, which contains a second set of ranging chirps 417 that have a different slope than those of the first set, for example they may be down-chirps having a slope that is opposed in sign and equal in absolute value to the slope of the first ranging chirps 416. The slave device responds with a set of aligned chirps after a repetition of the delay 424.

The variant of the invention disclosed above with reference to FIG. 7 has the advantage that each of the frames is a well formed ranging LoRa frame, complete of preamble and synchronization symbols, therefore it can be implemented on legacy devices, or requires minimal modification.

In another variant of the invention the ranging message has two set of ranging chirps of different (preferably opposite) slopes in a frame, as shown in FIG. 8. After a preamble the ranging message comprises the ranging symbols 416, having a first slope, a break 530, and a second set of ranging symbols 417 having opposite (or different) slope. the break 530 may be a silence, or contain data, according to the needs.

The slave device, having detected the preamble of the frame responds with a first set of reply chirps 419, aligned to the first set of ranging chirps 416, and with second set of reply chirps 418 aligned with the second set of ranging chirps 417, with opposite (or different slope). An advantage of this second variant is that the break 530 can be rather short, thus minimizing frequency drifts. On the other side, this variant introduces a new ranging mode that may not be recognizable by legacy devices.

The time interval corresponding to the break 530 for the embodiment of FIG. 8, and to the duration 520 for the embodiment of FIG. 7 is preferably determined by the master device from a pseudo-random function, or a suitable function with an output distributed in an interval. Dithering the length of this interval in this manner improves the Doppler shift resolution limit.

In a variant, several pairs of ranging exchanges occur after the preamble and header. This optimizes the time on air and reduces the delay between various measures. Successive pairs may be transmitted over different frequencies, or different antennas.

In a variant of the invention, the drift sources different from Doppler shift are characterized and can be estimated by the slave device based on the temperature and/or the data rate, and/or the frequency error. The slave device compensates them by inserting a delay between the received ranging chirps and the reply chirps, whose amount depends from temperature and/or data rate and/or frequency error and/or chirp slope.

The knowledge of the Doppler shift is per se a valuable information, which can be used to determine a relative speed of the slave node. In a variant of the invention, the distance between two devices is determined and tracked in time, using several range measurements to improve the precision, for example in a Kalman filter, or another suitable estimation algorithm. The relative speed between the nodes, deduced by the Doppler shift, can be added to the input variables of the estimation algorithm to improve its precision.

In a possible variant of the invention, the system may be configured to track not only the distance, but the position of one or more mobile nodes, based on the ranges and Doppler shifts between the mobile nodes and a set of gateways of known positions.

FIG. 11 represents schematically an exchange of ranging chirps between a master node A and a slave node B as disclosed above. The ranging request 201 and the ranging reply 231 contain ranging chirps not having all the same slope, whereby the master can align them in time, frequency, and phase. The slave node B is in motion with a velocity $\vec{v}_B$ relative to the master A. The unbiased frequency shift determined by node A will be $\Delta f/f = \pm 2|\vec{v}_{BA}|/c$ where $\vec{v}_{BA}$ is the projection of $\vec{v}_B$ along the direction A-B, and c is the speed of propagation. The factor 2 accounts for the double travel from A to B and from B back to A. Node E is a passive listener node, also called a "spy" node that receives the ranging request 201 from the master A and, in this example, is supposed at rest as the master. Node E receives the ranging request 201 from master A without Doppler shift, since there is no relative motion between A and E, and the ranging reply 321 from the slave B. It can be shown that the Doppler shift sensed by E is $\Delta f/f = \vec{v}_B \cdot (\vec{BA}/|\vec{BA}| + \vec{BE}/|\vec{BE}|)/c$, since the ranging request 201 is shifted a first time in the passage from A to B, proportionally to $|\vec{v}_{BA}|$ and then in the passage from B to E, proportionally to $|\vec{v}_{BE}|$. Thus, the passive listener node E can gather information on at least a component of the velocity $\vec{v}_B$ of the node B by listening to the exchange between A and B. A full determination of $\vec{v}_B$ could be obtained by listening to exchanges between B and several gateways acting as master.

In the example of FIG. 12, the master and slave A and B are supposed stationary, and the passive listener E moves with vector speed $\vec{v}_E$. In this case, E sees a shift $\Delta f/f = \vec{v}_B \cdot (\vec{EB}/|\vec{EB}| - \vec{EA}/|\vec{EA}|)/c$ deriving from a Doppler shift of the ranging request 201 proportional to $|\vec{v}_{EA}|$ and a Doppler shift of the ranging reply 231 proportional to $|\vec{v}_{EB}|$. Again, the passive listener node E can gather information on at least a component of its own velocity $\vec{v}_E$ by listening to the exchange between A and B.

In variants, a full determination of $\vec{v}_B$ or $\vec{v}_E$ could be obtained by listening to exchanges between several gateways acting as master and slave. The system could be extended to cases in which two or more nodes are moving, but these are not presented here to simplify the description. A combination of one or several active gateways which act as master and slave, and one or several spy or passive gateways which listen to the ranging exchanges without transmitting could provide position and velocity determination of the mobile nodes involved. The Doppler estimation from a passive gateway is the resultant of Doppler between mobile node and master gateway plus the Doppler between mobile node and passive gateway in a computable way.

In another variant, the gateways perform ranging exchanges between them, while one or several end-devices passively receive these exchanges. Thanks to the Doppler estimation feature of the invention, a mobile node can derive for each received ranging exchange the difference of its Doppler speeds towards the two gateways of that exchange. This gives an estimation of the projection of the mobile speed onto the line formed by these two gateways whose positions are known. Combining several pairs of gateways, un-aligned, gives an estimation of the speed vector.

The Doppler shifts can be used in the radio system of the invention also for other functions besides their use in ranging. For example, a high Doppler indicates a rapidly-varying channel, hence an elevated probability of fading and errors. A variant of the invention could estimate the quality of the transmission channel between a given pair of devices, based on the Doppler shift measured as above, and adjust the transmission mode, or the data rate in that channel, based on the Doppler shift estimation.

REFERENCE SYMBOLS IN THE FIGURES 30 base chirp
32 modulated chirp
100 RF section
102 RF switch
110 Frequency conversion
120 Power amplifier
129 oscillator, timebase
150 modulator
152 digital signal to transmit
154 buffer
160 LNA
170 down-conversion stage
180 processor, demodulator
182 reconstructed digital signal
190 controlled oscillator
200 baseband section
201 transmission of ranging request
230 master waits
231 reception of ranging response
236 dechirp
240 range estimate
300 reception of the ranging request
350 synchronization of time and frequency
352 ID check
356 computation of timing drift
357 alignment
359 adjusted dechirp
362 fine timing
364 delay
367 transmission of raging response
411 detect sequence
412 frame synchronization symbols
413 frequency synchronization symbols
414 fine synchronization symbols
415 header
416 ranging chirps
417 ranging chirps, down
418 reply chirps, down
419 reply chirps, up
420 ranging chirps, up
424 delay
520 break, inter-frames
530 break, in frame
548 dock
550 phases

The invention claimed is:

1. A system comprising a first radio device, acting as master and a second radio device, acting as slave, each of the first and second radio devices having a time reference and being arranged for transmitting and receiving radio signals that include a plurality of chirps, said first and second radio devices having a ranging mode in which the first radio device transmits to the second radio device a ranging request containing ranging chirps, and the second radio device responds to the ranging request transmitting to the first radio device a ranging reply containing reply chirps, the second radio device is configured to align the reply chirps in time and frequency with the ranging chirps, the system being configured to determine a range between the first radio device and the second radio device, based on time shifts between the ranging chirps and the reply chirps, wherein the ranging chirps do not have all the same slope, the system being configured to determine a Doppler-unbiased range and a Doppler shift between the first radio device and the second radio device, based on time shifts between the ranging chirps and the reply chirps, wherein the first radio device has a plurality of receiving antennas at known positions, and a switch for selecting each receiving antenna in turn, the first radio device being configured to switch between the antennas during the reception of the ranging chirps, such that each antenna is used to receive ranging chirps of different slopes, the master being configured to determine phases of ranging chirps received by each receiving antenna from the second radio device, and an angle of arrival of the radio signal based on said phases.

2. The system of claim 1, wherein the second radio device is configured to align the reply chirps with the ranging chirps in time, frequency, and phase.

3. The system of claim 2, wherein the first radio device is configured to determine a common phase error of the reply chirps and, provided no Doppler shift is present, to determine a phase of the propagation channel based on the common phase error.

4. The system of claim 1, wherein the first radio device is in communication with a plurality of auxiliary radio-receiving devices acting as passive listeners in fixed and known positions, the auxiliary radio-receiving device being configured to determine each a phase of the ranging chirps exchanged between the first radio device and the second radio device, the system being configured to determine an angle of arrival of the reply response based on the phases determined by the auxiliary receivers.

5. The system of claim 1, wherein the ranging chirps comprise chirps of opposite slopes.

6. The system of claim 1, configured to track the distance between the first radio device and the second radio device with an estimation algorithm using a series of range and Doppler shift measurements acquired over time.

7. The system of claim 6, configured to track the position of one or more mobile nodes acting as slaves, based on the ranges and Doppler shifts between the mobile nodes and a set of gateways of known positions acting as master.

8. The system of claim 1, including passive gateways acting as passive listeners that listen silently to the exchange between one gateway acting as master and one mobile node acting as slave, wherein the passive gateways are configured to determine a Doppler shift that is the resultant of the Doppler shift between the mobile node and the gateway acting as master and the Doppler shift between the mobile node and the passive gateway.

9. The system of claim 1, comprising gateways acting as master and gateways acting as slaves, and a mobile node configured act as passive listener and receive the ranging requests and ranging replies exchanged between gateways acting as master and gateway acting as slaves and to determine for each exchange of ranging requests and ranging replies a component of a relative velocity of the mobile node or of the gateway acting as master or of the gateway acting as slave in that exchange.

10. The system of claim 1, configured to estimate a quality of a transmission channel between the first device and the second device and adjust the transmission mode, or the data rate in that channel, based on the Doppler shift determination.

11. The system of claim 1, configured to reject measures showing inconsistency between distance and Doppler shift, or a Doppler shift exceeding a predetermined limit.

12. The system of claim 1, wherein the ranging request comprises a first frame and a second frame, the first frame and the second frame having a preamble for the detection and synchronization of the receiver, a header comprising an identifier of the second radio device, wherein the first frame contains a first set of ranging chirps having a first slope, and the second frame contains a second set of ranging chirps having a second slope different from the first slope.

13. The system of claim 1, wherein the ranging request comprises a frame having a preamble for the detection and synchronization of the receiver, a header comprising an identifier of the second radio device, a first set of ranging chirps having a first slope, and a second set of ranging chirps having a second slope different from the first slope.

14. The system of claim 12, wherein said first set of ranging chirps and said second set of ranging chirps are separated by a break and the first radio device is configured to dither the length of the break.

15. The system of claim 1, the second radio device being configured to introduce a delay between the ranging chirps and the reply chirps.

* * * * *